Oct. 27, 1970  S. T. SAHLIN ET AL  3,536,583
SPACER FOR RADIAL POSITIONING OF FUEL RODS
Filed Nov. 20, 1967  2 Sheets-Sheet 1
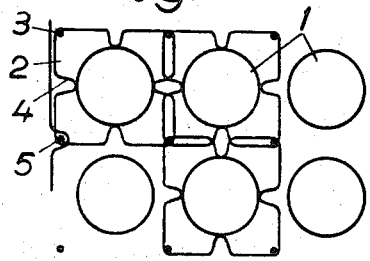
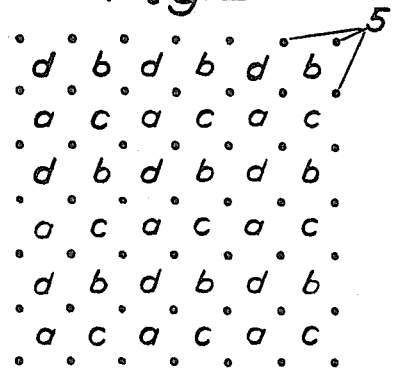
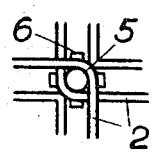
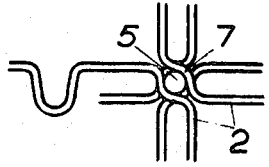
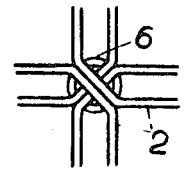
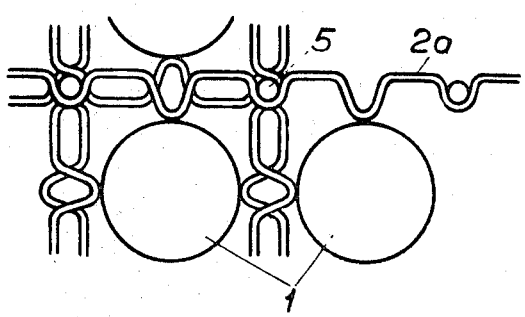
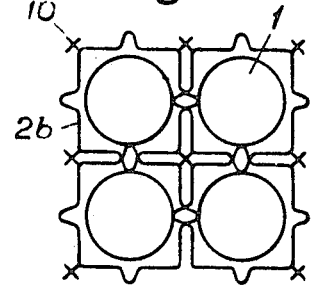
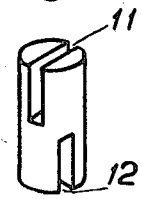
INVENTORS
SVEN THORBJORN SAHLIN
AART VAN SANTEN
JOHN E. TOMLIN
BY
Jennings Bailey, Jr.

United States Patent Office

3,536,583
Patented Oct. 27, 1970

3,536,583
SPACER FOR RADIAL POSITIONING OF FUEL RODS
Sven Thorbjörn Sahlin, Vasteras, and Aart van Santen, Hokasen, Sweden, and John E. Tomlin, Chandler's Ford, England, assignors to Allmanna Svenska Elektriska Aktiebolaget, Vasteras, Sweden, a Swedish corporation
Filed Nov. 20, 1967, Ser. No. 684,442
Claims priority, application Sweden, Nov. 23, 1966, 15,987/66
Int. Cl. G21c 3/34
U.S. Cl. 176—78                                   17 Claims

ABSTRACT OF THE DISCLOSURE

A nuclear reactor has parallel fuel rods and a spacer for the rods composed of spring strips having their width parallel to the axes of the rods, and with projections engaging the rods, the strips being connected at the points furthest from the rods to form a grid.

BACKGROUND OF THE INVENTION

Field of the invention

The present invention relates to a spacer for radial positioning of fuel rods in the fuel assembly of a reactor, which spacer comprises a spring system with spring elements in contact with the fuel rods.

THE PRIOR ART

Spacers of the above mentioned type are known in a great number of variations. This is because a spacer, despite its seemingly simple design, must in many respects fulfil extremely high demands. Of particular importance is the flow resistance of the spacer with respect to the coolant which flows through the fuel assembly along the fuel rods. This flow resistance should be as small as possible, and even minor improvements in the flow resistance may have decisive importance for the economy of the reactor. Of course, the mechanical strength, spring action, contact pressure and the shape of the contact surfaces and also the influence on the neutron flux in the fuel assembly are of importance. The construction of the spacer is further complicated by the fact that the fuel rods are positioned very close together and the available space is therefore very limited. This causes particular difficulty in respect of the spring action of the spacer springs, since it is very difficult to make very short spring elements sufficiently resilient.

SUMMARY OF THE INVENTION

The above-mentioned problem is solved by the invention in a considerably more simple and satisfactory manner than in known spacer constructions. The invention is characterised in that the spring system of the spacer forms a continuous spring grid and that the parts of the spring grid are attached to each other at or essentially at those points between the fuel rods which are situated furthest away from the nearest adjacent fuel rods. By choosing the attachment points in this way the greatest possible length is obtained for the resilient parts between the attachment points. Thus it is possible to achieve sufficient resilience in the springs and they can be made as spring bands with the band surface parallel to the fuel rods, thus providing the least flow resistance.

BRIEF DESCRIPTION OF THE DRAWINGS

The basic principle of the invention can be varied in many ways. Several basic types of such variations will be described more fully with reference to the accompanying drawings which show schematically different embodiments of the invention. FIG. 1 shows a spacer with closed annular grid parts. FIG. 2 shows a mounting diagram for a spacer according to FIG. 1. FIGS. 3, 4 and 5 show different designs for the attachment points. FIGS. 6 and 7 show two different methods of constructing a spring grid. FIG. 8 shows an attachment element.

DESCRIPTION OF THE PREFERRED EMBODIMENTS

Figure 9:
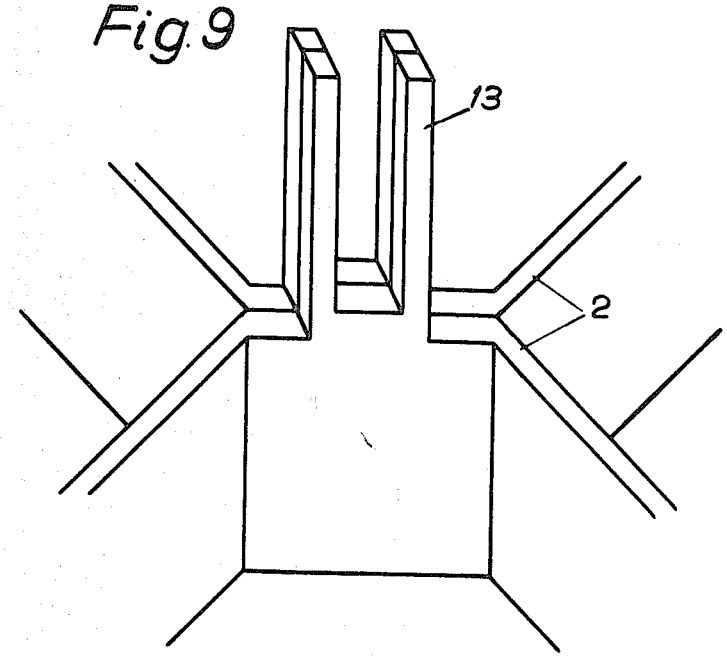
FIG. 9 shows an attachment element made in one piece with the spring grid.

In the figures: 1 designates the fuel rods, 2, 2a, 2b or 2c designate parts of the spring grid and 3 designates the joining points or attachments points for the parts of the spring grid. The spring elements of the spring grid are provided with abutment bodies 4 in the form of protuberances in the spring material. It is important that these protuberances are sufficiently long so that they will yield in the axial direction of the fuel rods as well. The fuel rods 1 are subjected to slight axial alterations in position due to heat expansion and vibrations and the abutment bodies 4 of the spring grid must follow these movements as otherwise these abutment bodies and fuel rods slide on each other which causes wear on the casing of the fuel rods. The spring grid is preferably constructed of resilient strip material, but even wire might be used.

At the attachment points 3 which are arranged as far as possible from four adjacent fuel rods, an attachment element 5 is arranged in the form of a pin. The closed, substantially square grid parts surrounding each fuel rod 1 have somewhat greater side lengths than the pitch in the fuel rod pattern and consequently even greater side lengths than the pitch between the attachment pins 5 which will be surrounded by each such closed grid part. The described embodiment of the grid parts allows the protuberances 4 to be relatively long and this provides satisfactory spring action also in axial direction.

Since the closed grid parts surround the attachment pins 5, they must be applied at several different levels. The mounting of a spacer constructed according to this principle is illustrated in FIG. 2. The attachment pins 5 are inserted in a fixture after which grid parts of the type shown in FIG. 1 are inserted in the order indicated by the letters in FIG. 2. Grid parts are first inserted in positions *a* and thereafter in positions *b*, *c* and *d*. The attachment at the pins 5 is secured suitably by welding. The pins 5 may also be designed so that they form a rivet joint or a screw joint.

FIG. 3 shows a method of reinforcing the attachment at an attachment pin 5 with the help of an outer, slotted tube 6 which is pushed over the pin 5 and the parts 2 of the spring grid. The tube 6 may be positioned by bending the slotted end.

FIGS. 4 and 5 show two embodiments in which the closed grid parts are arranged in only two planes instead of four planes as in FIGS. 1, 2 and 3. In the embodiment according to FIG. 4 inwardly protruding protuberances 7 are arranged at the corner points of the grid parts. The attachment pin 5 will thus be situated outside the closed grid part. In FIG. 5 the attachment pin 5 has been omitted, the corner parts of the grid parts made straight and an attachment member 6 of the same type as in FIG. 3 arranged at the attachment point of the grid parts.

FIG. 6 shows a spring grid constructed of spring bands 2a, which are substantially straight, which spring bands form a square-net pattern and are fixed to the attachment pins 5 at the intersections.

FIG. 7 shows an embodiment with closed grip parts 2b. These grid parts 2b, contrary to the grid parts 2 according to FIG. 1, abut the neighbouring fuel rods 1 on the outer side of the grid part, whereas the fuel rod surrounded by the grid part 2b, does therefore not come into contact with this grid part. The attachment means in this case consists of corner pins 10 in the shape of a cross. Other suitable types of corner pins are, of course also feasible for this embodiment.

FIG. 8 hows an attachment pin having two slots 11 and 12 perpendicular to each other. This type of attachment pin may be used with advantage for the attachment points according to FIG. 5.

Figure 10:
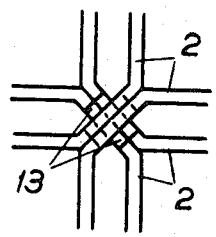
FIG. 10 shows a view of a complete attachment point according to FIG. 9.

FIG. 9 shows an attachment point in a spring grid where the spring bands 2 are provided with forks 13 in a part of the sheet material continuous with the spring band. The fork 13 is intended to hold the corner parts of the spring strips arranged in an adjacent plane. A complete attachment point of this type is illustrated in FIG. 10. The upwardly pointing fork 13 is shown in unbroken lines. The corresponding downwardly pointing fork is hidden by the upper plane and is therefore shown in dotted lines. It is suitable to fix all joints of different grid parts by soldering or welding.

Figure 11:
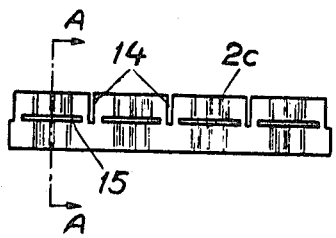
FIG. 11 shows part of a spring grid.
Figure 12:
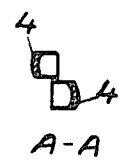
FIG. 12 shows the section A—A in FIG. 11.

FIG. 11 shows a two-plane spring band 2c with transverse slots 14 at the attachment points and longitudinal slots 15 between the attachment points. The spring grid is built up by placing spring bands of the type shown in the figure perpendicular to each other, the transverse slots 14 facing each other, so that the bands are in the same plane. The longitudinal slots 15 separate the upper and lower parts of the band which are provided with protuberances 4 in opposite directions as seen in FIG. 12, which shows the section A—A in FIG. 11. In FIG. 12 the protuberances 4 are drawn exaggeratedly convex in the shown section. A certain very slight, but nevertheless important, convex shape is usually automatically obtained when the abutment bodies 4 are formed by bending. The convex shape means that no sharp edges will wear against the fuel rods.

Figure 13:
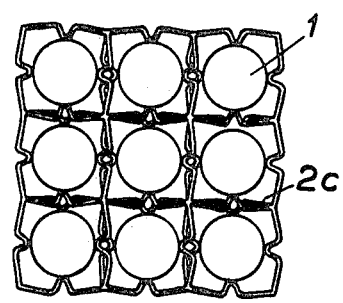
FIG. 13 shows a view of a spring grid built up of parts according to FIGS. 11 and 12.

FIG. 13 shows an end view of a spacer constructed of elements according to FIGS. 11 and 12. The spring grid 2 may be provided with a rigid outer frame, but it is also possible to construct the spacer with no outer frame as shown in FIG. 13. When the fuel rods 1 are inserted in the spring grid the springs are pressed back so that they overlap each other as the figure shows. In unloaded condition the angular position of the springs is approximately the opposite.

The invention is not limited to the shown embodiments which all relate to spacers for fuel assemblies having square cross section. For other types of fuel assemblies, for example, hexagonal or triangular spring grids may be built up on the same principle as that indicated for square spring grids. Several variations and modifications are feasible within the scope of the following claims.

We claim:
1. In a nuclear reactor having parallel fuel rods, a spacer for radial positioning of said fuel rods, said spacer comprising a continuous spring grid having elongated spring elements abutting said fuel rods at contact points, the elongation of said spring elements being in a plane perpendicular to the longitudinal axes of said fuel rods, each of said spring elements being at least indirectly attached to at least one other spring element at one attachment point on each side of any of said contact points, said attachment points being suited substantially at those points between the fuel rods which are furthest away from the nearest adjacent fuel rods, wherein the improvement comprises that the attachment points and the contact points are arranged alternately along each of said spring elements, and that at least in a central part of the spacer each contact point is situated half-way between two adjacent attachment points, and each attachment point is situated half-way between two adjacent contact points.

2. A spacer according to claim 1, wherein at least in the inner part of the spacer between two adjacent attachment points of the grid two spring elements are arranged in contact each with one of the nearest fuel rods.

3. A spacer according to claim 1, wherein the spring elements are provided with abutment bodies in the form of projections in the spring material engaging the fuel rods.

4. A spacer according to claim 1, wherein pin-like members attaching the parts of the spring grid to each other.

5. A spacer according to claim 4, wherein the spring elements are arranged at least at two levels and that the spring elements engaging one fuel rod are attached to the opposite side of the pin-like member from the fuel rod so that the distance between the base lines of two oppositely positioned spring elements engaging the same fuel rod is greater than the spacing distance between the fuel rods.

6. A spacer according to claim 5, wherein the spring grid is constructed of closed spring bands surrounding individual fuel rods and attached to each other and arranged at four different levels.

7. A spacer according to claim 6, wherein the spring bands surrounding each separate fuel rod also surround the attachment elements arranged at the attachment points.

8. A spacer according to claim 4, wherein the spring elements surrounding each separate fuel rod at the attachment point abut each other with their outer sides.

9. A spacer according to claim 8, wherein there is an outer attachment element which encloses between itself and the pin-like member the spring elements converging to the attachment points.

10. A spacer according to claim 1, wherein the spring elements constitute substantially straight continuous spring bands.

11. A spacer according to claim 1, wherein the spring grid is constructed of closed spring bands surrounding each individual fuel rod and provided with abutment projections abutting the fuel rods situated nearest around such individual fuel rod.

12. A spacer according to claim 1, wherein attachment elements connecting said spring elements comprising pin-like members having slots therein in which the attachment parts of the spring elements are positioned.

13. A spacer according to claim 1, wherein the spring grid is constructed of bent bands intersecting each other and provided at the intersection points with transverse slots so that they can be at least partly inserted into each other, said bands being divided into upper and lower parts by longitudinal slots between the intersection points.

14. A spacer according to claim 13, wherein the upper and lower band parts are provided with abutment projections pointing into opposite directions each abutment projection engaging one fuel rod.

15. A spacer according to claim 13, wherein the upper and lower parts of the spring bands, when the fuel rods are inserted, overlapping each other in axial direction.

16. A spacer according to claim 1, wherein at their attachment points the grid parts are provided with forked axially projecting projections, between which the attachment parts of grid parts arranged in a continuous plane are fitted.

17. A spacer according to claim 1, wherein the attachment at the attachment points is secured by welding.

References Cited

UNITED STATES PATENTS

| 3,355,090 | 6/1966 | Leirvik | 176—78 X |
| 3,350,275 | 10/1967 | Venier et al. | 176—78 X |
| 3,369,973 | 2/1968 | Voight et al. | 176—76 X |

CARL D. QUARFORTH, Primary Examiner

MELVIN J. SCOLNICK, Assistant Examiner

U.S. Cl. X.R.

176—76